(12) United States Patent
Buschbeck

(10) Patent No.: US 10,605,334 B2
(45) Date of Patent: Mar. 31, 2020

(54) SELF-VENTILATED BI-DIRECTIONAL TRACTION DRIVE UNIT

(71) Applicant: Bombardier Transportation GmbH, Berlin (DE)

(72) Inventor: Jan Buschbeck, Berlin (DE)

(73) Assignee: Bombardier Transportation GmbH, Berlin (DE)

( * ) Notice: Subject to any disclaimer, the term of this patent is extended or adjusted under 35 U.S.C. 154(b) by 176 days.

(21) Appl. No.: 15/742,110

(22) PCT Filed: Jun. 18, 2016

(86) PCT No.: PCT/EP2016/064107
§ 371 (c)(1),
(2) Date: Jan. 5, 2018

(87) PCT Pub. No.: WO2017/005475
PCT Pub. Date: Jan. 12, 2017

(65) Prior Publication Data
US 2018/0216706 A1    Aug. 2, 2018

(30) Foreign Application Priority Data

Jul. 8, 2015  (EP) ..................................... 15175939

(51) Int. Cl.
*F16H 3/00* (2006.01)
*H02K 9/06* (2006.01)
*F16H 3/66* (2006.01)

(52) U.S. Cl.
CPC ............. *F16H 3/005* (2013.01); *F16H 3/666* (2013.01); *F16H 2200/0034* (2013.01);
(Continued)

(58) Field of Classification Search
CPC .................. H02K 9/06; F16H 3/005; F16H 2200/2084–2092; F16H 2200/2005–2007; F16H 2200/0034
See application file for complete search history.

(56) References Cited

U.S. PATENT DOCUMENTS

| 5,607,369 A | 3/1997 | Yang |
| 8,449,421 B2 * | 5/2013 | Jung ........................ B62M 6/65 |
| | | 475/12 |
| 2012/0100948 A1 | 4/2012 | Lin et al. |

FOREIGN PATENT DOCUMENTS

| DE | 19842473 A1 | 8/1999 |
| DE | 102005051373 A1 | 5/2007 |

(Continued)

OTHER PUBLICATIONS

Dudley, Darle W., Gear Handbook—The Design, Manufacture, and Application of Gears, 1962, McGraw-Hill, section 3-15, Table 3-5 (Year: 1962).*

*Primary Examiner* — David R Morris
*Assistant Examiner* — James J Taylor, III
(74) *Attorney, Agent, or Firm* — The Webb Law Firm

(57) ABSTRACT

A self-ventilated bi-directional traction drive unit (10) comprises a bi-directional motor (12), an asymmetric fan (14) for ventilating the motor (12), and a mechanical transmission (14) between a motor shaft (24) of the motor (12) and an asymmetric fan rotor (38) of the fan (14). The mechanical transmission (14) is operative to drive the fan rotor (38) in a preferred fan direction (102) with a first constant gear ratio Ri when the motor shaft (24) rotates in a first traction direction and to drive the fan rotor (38) in the preferred fan direction with a second constant gear ratio R2 when the motor shaft (24) rotates in a second traction direction opposite to the first traction direction. The mechanical transmission (14) includes a planetary gear train (28) comprising a sun gear (30), a sun gear (32) and a set of one or more planet gears (34) supported on at least one planet carrier (36) and further includes free wheels (40, 42, 44, 46, 48, 50, 52), A first (46) of the free wheels operates between the planet carrier (36) and the fan rotor (38) to block the rotation of the fan rotor (38) with respect to the planet carrier (Continued)

(36) in a direction opposite to the preferred fan direction and a second (50) of the free wheels operates between the ring gear (32) and the fan rotor (38) to block the rotation of the fan rotor (38) with respect to the ring gear (32) in the preferred fan direction and in that the mechanical transmission (14) is such that (I).

14 Claims, 4 Drawing Sheets

(52) U.S. Cl.
CPC ............... *F16H 2200/2005* (2013.01); *F16H 2200/2007* (2013.01); *F16H 2200/2084* (2013.01); *F16H 2200/2089* (2013.01); *F16H 2200/2092* (2013.01); *F16H 2200/2097* (2013.01); *H02K 9/06* (2013.01)

(56) References Cited

FOREIGN PATENT DOCUMENTS

| | | | | |
|---|---|---|---|---|
| DE | 102007020345 | A1 | 11/2008 | |
| DE | 102016221173 | A1 * | 5/2018 | ............. F16H 3/005 |
| EP | 2444312 | A1 | 4/2012 | |
| KR | 20030023132 | A | 3/2003 | |

* cited by examiner

SELF-VENTILATED BI-DIRECTIONAL TRACTION DRIVE UNIT

CROSS-REFERENCE TO RELATED APPLICATIONS

This application is the United States national phase of International Application No. PCT/EP2016/064107 filed Jun. 18, 2016, and claims priority to European Patent Application No. 15175939.6 filed Jul. 8, 2015, the disclosures of which are hereby incorporated in their entirety by reference.

TECHNICAL FIELD OF THE INVENTION

The present invention relates to a self-ventilated bi-directional traction drive unit, in particular for a rail vehicle.

BACKGROUND ART

Conventional self-ventilated bi-directional traction units for rail vehicles include a traction motor shaft, which can rotate in both direction to drive a vehicle in both a forward and backward direction, and a fan directly mounted on the motor shaft to cool the motor. To obtain the same cooling performance irrespective of the direction of travel, the fan usually has a so-called symmetric design, i.e. with symmetric blades, and the efficiency of the fan is not optimised, which means that the dimension, energy consumption and generated noise are higher than desirable. Alternatively, the fan may be equipped with controllable pitch blades. But such equipment is particularly costly to manufacture and maintain.

Departing from the usual symmetric fan arrangement, a self-ventilated bi-directional traction drive unit known from DE19842473 comprises a bi-directional motor, an asymmetric fan for ventilating the motor, and a mechanical transmission device between the motor and the fan. The mechanical transmission is operative to drive the fan rotor in one and the same direction and with a constant gear ratio 1:1 irrespective of the direction of rotation of the motor shaft. The mechanical transmission includes a planetary gear train comprising a ring gear, a sun gear and a set of planet gears supported on at least one planet carrier. Free wheels are provided between the planet gears and the planet carrier to lock the planet gear in one direction of rotation. This arrangement provides interesting results in terms of direction of rotation of the fan and speed ratio. However, the offset position of the free wheels with respect to the main rotation axis of the fan and of the motor shaft may result in rapid and excessive wear and deterioration of the free wheel in use. Moreover, the gear ratio 1:1 is inherent to this structure and cannot be changed without adding a reduction gear. Hence, the gear ratio cannot be optimised to meet the cooling and noise emission requirements.

A differential motion gear system to control the speed ratio by means of the change of input direction is disclosed in U.S. Pat. No. 5,607,369. This system causes the changing of the output speed ratio by changing the revolving direction of the input shaft of the differential motion gear system. In one embodiment, the differential motion gear system comprises: an input shaft rotatable in opposite directions; an output shaft; a first one-way drive mechanism connected between the input shaft and the output shaft; a sun gear connected to the input shaft; a differential motion gear engaged with the sun gear; a ring gear engaged with the differential motion gear; a stationary case; and means attaching the ring gear to the stationary case so as to prevent relative rotation between the ring gear and the stationary case. As a result, the speed ratio is $-T1/T2$ in one direction and $1+T1/T2$ in the other direction, where T1 is the number of teeth of the sun gear and T2 the number of teeth of the ring gear. While the output shaft rotates in the same direction irrespective of the direction of rotation of the input shaft, the significant difference in the speed ratios, which is the main purpose of this system, makes it unsuitable for self-ventilated drive unit.

Prior document DE10 2007 020345 discloses a self-ventilated bi-directional traction drive unit comprising a bi-directional motor, a fan for ventilating the motor, and a mechanical transmission between a motor shaft of the motor and a fan rotor of the fan, wherein the mechanical transmission is operative to drive the fan rotor in a preferred fan direction with a first constant gear ratio when the motor shaft rotates in a first traction direction and to drive the fan rotor in the preferred fan direction with a second constant gear ratio when the motor shaft rotates in a second traction direction opposite to the first traction direction, wherein the mechanical transmission includes a planetary gear train comprising a sun gear, a ring gear and a set of one or more planet gears supported on at least one planet carrier and further includes free wheels, wherein one of the free wheels operates between the ring gear and the fan rotor to block the rotation of the fan rotor with respect to the ring gear in the preferred fan direction.

EP 2 444 312 discloses a speed changing apparatus, which uses clockwise and anti-clockwise rotation of a motor couple with a planet gear set to achieve the purpose of a gear shift, i.e. to provide different output gear ratios in the same output rotation direction. To this end, the speed changing apparatus comprises a bi-directional drive unit comprising a bi-directional motor, an output ring sleeve, and a mechanical transmission between a motor shaft of the motor and the output ring sleeve, wherein the mechanical transmission is operative to drive the output ring sleeve in a preferred direction with a first constant gear ratio when the motor shaft rotates in a first traction direction and to drive the output ring sleeve in the preferred direction with a second constant gear ratio when the motor shaft rotates in a second traction direction opposite to the first traction direction, wherein the mechanical transmission includes a planetary gear train comprising a sun gear, a ring gear and a set of one or more planet gears supported on at least one planet carrier and further includes free wheels. A first of the free wheels operates between the planet carrier and the output ring sleeve to block the rotation of the output ring sleeve with respect to the planet carrier in a direction opposite to the preferred direction and a second of the free wheels operates between the ring gear and the output ring sleeve to block the rotation of the output ring sleeve with respect to the ring gear in the preferred direction.

SUMMARY OF THE INVENTION

The invention aims to provide improved a self-ventilated drive unit, which can provide a substantial reduction in the noise emission of the fan irrespective of the travel direction, by purely mechanical means.

According to the invention, there is provided a self-ventilated bi-directional traction drive unit comprising a bi-directional motor, an asymmetric fan for ventilating the motor, and a mechanical transmission between a motor shaft of the motor and an asymmetric fan rotor of the fan, wherein the mechanical transmission is operative to drive the fan rotor in a preferred fan direction with a first constant gear ratio R1 when the motor shaft rotates in a first traction direction and to drive the fan rotor in the preferred fan direction with a second constant gear ratio R2 when the motor shaft rotates in a second traction direction opposite to the first traction direction, wherein the mechanical transmission includes a planetary gear train comprising a sun gear, a ring gear and a set of one or more planet gears supported on at least one planet carrier and further includes free wheels, characterised in that a first of the free wheels operates between the ring gear and the fan rotor to block the rotation of the fan rotor with respect to the ring gear in the preferred fan direction and a second of the free wheels operates between the planet carrier and the fan rotor to block the rotation of the fan rotor with respect to the planet carrier in a direction opposite to the preferred fan direction.

Preferably, the mechanical transmission is such that:

$$\frac{90}{100} \le \left|\frac{R_1}{R_2}\right| \le \frac{110}{100}$$

Preferably, the mechanical transmission is such that the first constant gear ratio $R_1$ is different from 1:1 and the second constant gear ratio $R_2$ is different from 1:1.

According to a preferred embodiment, the free wheels, the motor shaft and the fan rotor have a common rotation axis.

Advantageously, the planet gears are free to rotate in both directions with respect to the planet carrier. Wear problems that may occur when a free wheel is located between the planet wheel and planet carrier are avoided.

Preferably, one of the free wheels operates between the planet carrier and a fixed housing of the traction drive unit to block the rotation of the planet carrier with respect to the fixed housing in the direction opposite to the preferred fan direction.

Preferably, one of the free wheels operates between the ring gear and a fixed housing of the traction drive unit, to block the rotation of the ring gear with respect to the planet carrier in the direction opposite to the preferred fan direction.

Preferably, one of the free wheels operates between the motor shaft and the sun gear to block the rotation of sun gear with respect to the motor shaft in the direction opposite to the preferred fan direction.

Preferably, one of the free wheels operates between the sun gear and a fixed housing of the drive unit, to block the rotation of the sun gear with respect to the fixed housing in the preferred fan direction.

BRIEF DESCRIPTION OF THE FIGURES

Other advantages and features of the invention will then become more clearly apparent from the following description of specific embodiments of the invention given as non-restrictive examples only and represented in the accompanying drawings in which.

Corresponding reference numerals refer to the same or corresponding parts in each of the figures.

DETAILED DESCRIPTION OF PREFERRED EMBODIMENTS

Figure 1:
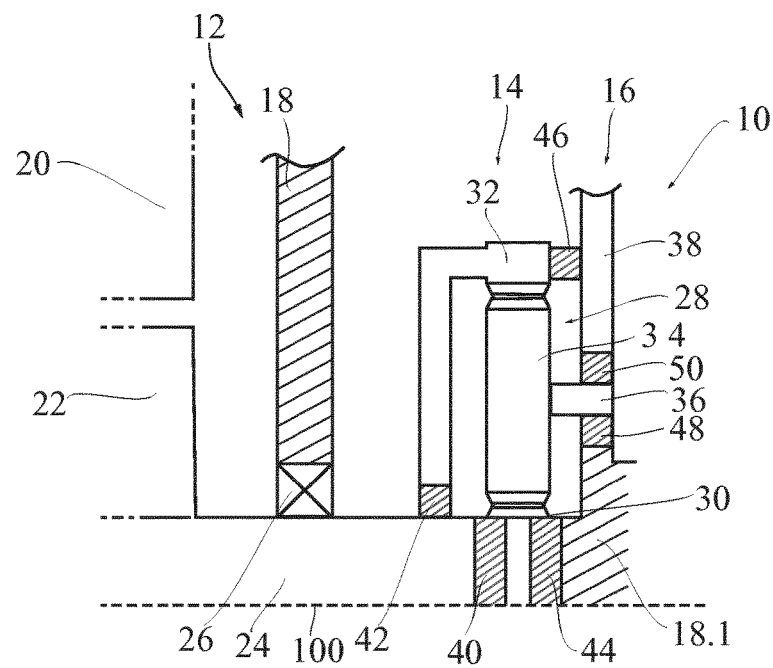
FIG. 1 is a schematic illustration of a self-ventilated drive unit according to one embodiment of the invention.

With reference to FIG. 1, a drive unit 10 according to a first embodiment of the invention for driving one or more wheels (not shown) of a rail vehicle comprises a motor unit 12, a mechanical transmission 14 and a fan 16, received in a housing 18. The motor unit 12 comprises a stator 20 received in and fixed to the housing 18, and a rotor 22 fixed to or integral with a motor shaft 24 and supported for rotation about a revolution axis 100 by a main bearing 26.

The mechanical transmission 14 comprises a planetary gear set 28 consisting of a sun gear 30, a ring gear 32 and a set of one or more planet gears 34 supported for rotation by a rotatable planet carrier 36. The sun gear 30, ring gear 32 and planet carrier 36 have a common axis of revolution, which is coaxial with the revolution axis 100 of the motor shaft 24 and with a revolution axis of a rotor 38 of the fan 16. The fan rotor 38 has an asymmetrical shape, which is optimised for operating in one direction of rotation, which will be called hereinafter the preferred fan direction.

The mechanical transmission 14 further comprises a set of free wheels including:
  a first input side free wheel 40, which operates between the motor shaft 24 and the sun gear 30 to block the rotation of sun gear 30 with respect to the motor shaft 24 in the preferred fan direction;
  a second input side free wheel 42, which operates between the motor shaft 24 and the ring gear 32, to block the rotation of the ring gear 32 with respect to the motor shaft 24 in the direction opposite to the preferred fan direction;

a first intermediate free wheel 44, which operates between the sun gear 30 and a part 18.1 of the housing 18 of the drive unit 10, to block the rotation of the sun gear 30 with respect to the housing 18 in the preferred fan direction;

a first output side free wheel 46, which operates between the ring gear 32 and the fan rotor 38 to block the rotation of the fan rotor 38 with respect to the ring gear 32 in the preferred fan direction;

a second intermediate free wheel 48, which operates between the planet carrier 36 and a part of the housing 18 of the traction drive unit 10 to block the rotation of the planet carrier 36 with respect to fixed housing 18 in the direction opposite to the preferred fan direction; and a second output side free wheel 50, which operates between the planet carrier 36 and the fan rotor 38, to block the rotation of the fan rotor 38 with respect to the planet carrier 36 in the direction opposite to the preferred fan direction.

As a result of this arrangement, the mechanical transmission is operative to drive the fan rotor 38 in the preferred fan direction with a first constant gear ratio $R_1$ when the motor shaft 24 rotates in the preferred fan direction and to drive the fan rotor 38 in the preferred fan direction with a second constant gear ratio $R_2$ which has the same magnitude as $R_1$ (but an opposite sign) when the motor shaft 24 rotates in the direction opposite to the preferred fan direction. This is illustrated in more details on FIGS. 2 to 5.

Figure 2:
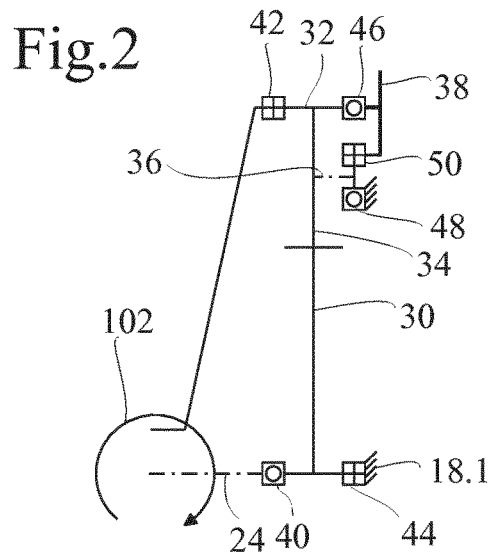
FIG. 2 is a functional diagram of the drive unit of FIG. 1 when a motor shaft of the drive unit rotates in a preferred fan direction.
Figure 3:
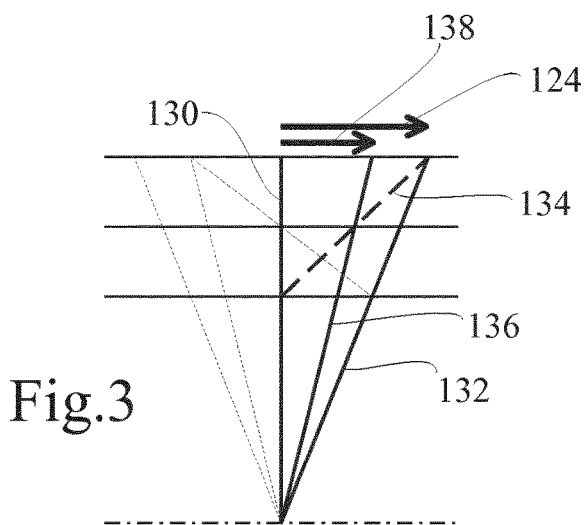
FIG. 3 is a speed diagram (so called Kutzbach diagram) of the drive unit of FIG. 1 when the motor shaft of the drive unit rotates in the preferred fan direction.

In the schematic illustrations of FIGS. 2 and 3, the motor shaft 24 rotates in the preferred fan direction 102 to lock the second input side free wheel 42 and unlock the first input side free wheel 40. The motor shaft 24 drives the ring gear 32 in the preferred fan direction. The planet carrier 36 is free to rotate in the preferred fan direction but the sun gear 30 is not, because the second intermediate free wheel 48 is unlocked and the first intermediate free wheel 44 is locked. The fan rotor 38 is driven by the planet carrier 36 via the locked second output side free wheel 50, while the first output side free wheel 46 remains unlocked. The resulting speed vectors are depicted in the speed diagram of FIG. 3, where 124 is the speed of the motor shaft, 130 the speed of the sun gear, 132 the speed of the ring gear, 134 the speed of the planet gears, 136 the speed of the planet carrier and 138 the speed of the fan rotor. The planet gears 34 rotate to drive the planet carrier 36 in the preferred fan direction at a reduced speed with respect to the rotation speed of the motor shaft 24. The speed ratio $R_1$ between the rotation speed of the motor shaft 24 and the rotation speed of the planet carrier 36 is equal to the ratio of the number of teeth $N_R$ of the ring gear 32 to the number of teeth $N_S$ of the sun gear 30:

$$R_1 = \frac{N_R + N_S}{N_R} \quad (1)$$

Figure 4:
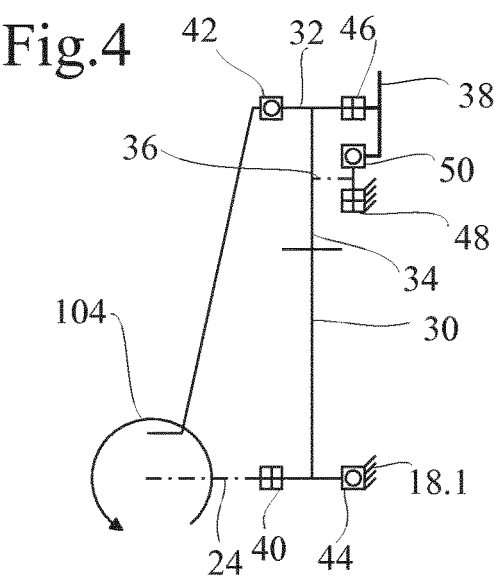
FIG. 4 is a functional diagram of the drive unit of FIG. 1 when the motor shaft of the drive unit rotates in a direction opposite to the preferred fan direction.
Figure 5:
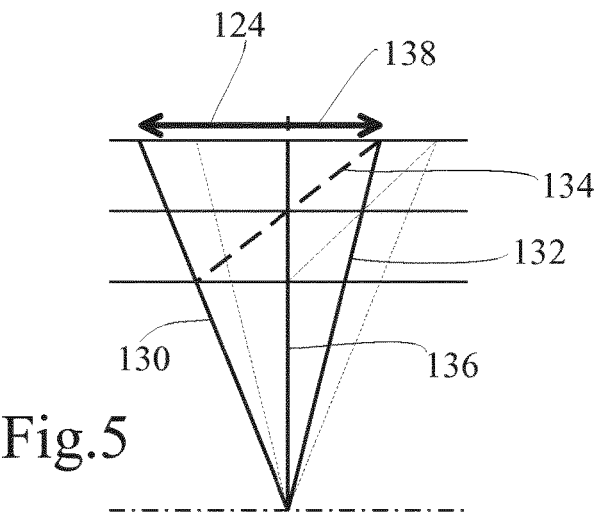
FIG. 5 is a speed diagram of the drive unit of FIG. 1 when the motor shaft of the drive unit rotates in the direction opposite to the preferred fan direction.

In the schematic illustrations of FIGS. 4 and 5, the motor shaft 24 rotates in the direction 102 opposite to the preferred fan direction. As a result, the first input side free wheel 40 is locked and the first intermediate free wheel 44 is unlocked, so that the motor shaft 24 drives the sun gear 30 in the direction opposite to the preferred fan direction. The second intermediate free wheel 48 is locked and prevents rotation of the planet carrier 36 in the direction opposite to the preferred fan direction, so that the planet gears 34 rotate and drive the ring gear 32 in the preferred fan direction, which unlocks the second input side free wheel 42. Finally, the first output side free wheel 46 is locked and the second output side free wheel 50 is unlocked, so that the fan rotor 38 rotates with the ring gear 32 in the preferred fan direction. The resulting speed vectors are depicted in the speed diagram of FIG. 5. The speed ratio $R_2$ between the rotation speed of the motor shaft 24 and the rotation speed of the fan rotor 38 is such that:

$$R_2 = -\frac{N_R}{N_S} \quad (2)$$

In order to have the same cooling for both directions of travel the number of teeth must be chosen in a way that $R_1$ equals $-R_2$. That is possible for exactly one gear ratio $|R_{1,2}|=1.618$. Hence, it becomes possible to provide the required cooling and at the same time reduce the fan rotation speed compared to the shaft speed, so that the noise level will also be kept low.

Figure 6:
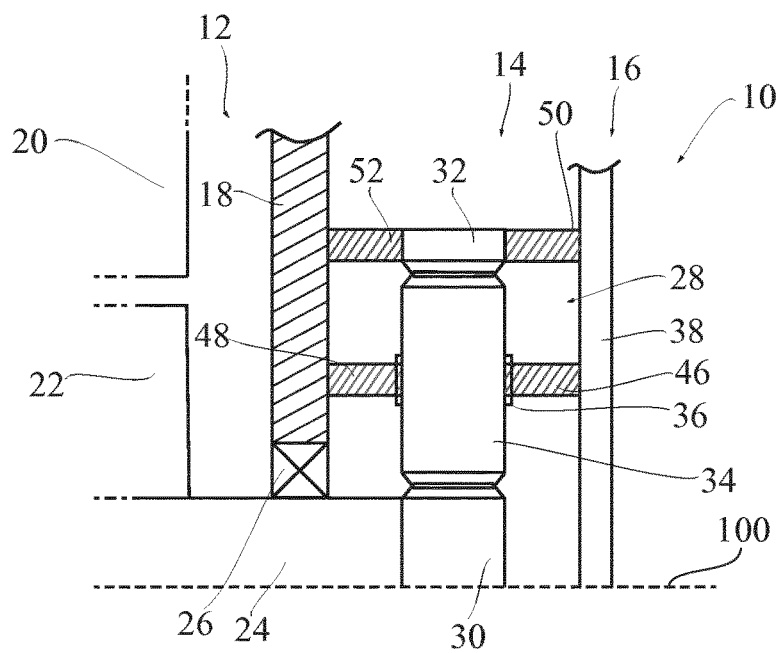
FIG. 6 is a schematic illustration of a self-ventilated drive unit according to another embodiment of the invention.

Referring now the second embodiment of FIG. 6, a drive unit 10 for driving one or more wheels of a rail vehicle comprises a motor unit 12, a mechanical transmission 14 and a fan 16 supported by a housing 18. The motor unit 12 comprises a stator 20 received in and fixed to the housing 18, and a rotor 22 fixed to or integral with a motor shaft 24 and supported by a main bearing 26 for rotation about a revolution axis 100.

The mechanical transmission 14 comprises a planetary gear set 28 consisting of a sun gear 30 fixed to or integral with the motor shaft 24, a ring gear 32 and a set of one or more planet gears 34 supported for rotation by a rotatable planet carrier 36. The sun gear 30, ring gear 32 and planet carrier 36 have a common axis of rotation, which is coaxial with the revolution axis 100 of the motor shaft 24 and with a revolution axis of a rotor 38 of the fan 16. The fan rotor 38 is optimised for an operation in one direction of rotation, which will be called the preferred fan direction.

The mechanical transmission 14 further comprises a set of free wheels including:

a first intermediate free wheel 52, which operates between the ring gear 32 and the housing 18 to block the rotation of the ring gear 32 with respect to the housing 18 in the direction opposite to the preferred fan direction;

a second intermediate free wheel 48, which operates between the planet carrier 36 and the housing 18 to block the rotation of the planet carrier 36 with respect to the housing 18 in the direction opposite to the preferred fan direction;

a first output side free wheel 46, which operates between the planet carrier 36 and the fan rotor 38, to block the rotation of the fan rotor 38 with respect to the planet carrier 36 in the direction opposite to the preferred fan direction; and a second output side free wheel 50, which operates between the ring gear 32 and the fan rotor 38, to block the rotation of the fan rotor 38 with respect to the ring gear 32 in the direction opposite to the preferred fan direction.

As a result of this arrangement, the mechanical transmission 16 is operative to drive the fan rotor 38 in the preferred fan direction with a first constant gear ratio $R_1$ when the motor shaft rotates in a first traction direction 102 and to drive the fan rotor 38 in the preferred fan direction with a second constant gear ratio $R_2$ when the motor shaft rotates in a second traction direction 104 opposite to the first traction direction. This is illustrated in more details on FIGS. 7 to 10.

Figure 7:
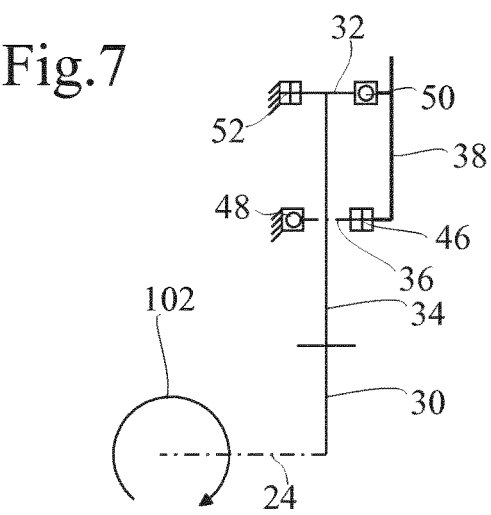
FIG. 7 is a functional diagram of the drive unit of FIG. 6 when the motor shaft of the drive unit rotates in the preferred fan direction.
Figure 8:
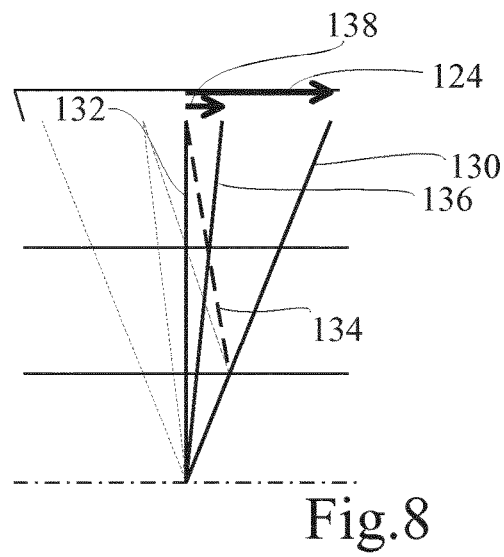
FIG. 8 is a speed diagram of the drive unit of FIG. 6 when the motor shaft of the drive unit rotates in the preferred fan direction.

In the schematic illustrations of FIGS. 7 and 8, the sun gear 32 rotates in the preferred fan direction 102 together with the motor shaft. The second intermediate free wheel 48 is unlocked and the planet carrier 36 is free to rotate in the preferred fan direction. The first intermediate free wheel 52 is locked to prevent rotation of the ring gear 32 in the direction opposite to the preferred fan direction. The locked first output side free wheel 46 and unlocked second output side free wheel 50 allow the fan rotor 38 to rotate together with the planet carrier 36 in the preferred fan direction 102. As a result, the planet gears 34 rotate to drive the planet carrier 36 in the preferred fan direction 102 at a reduced speed. The corresponding speed vectors are depicted in the speed diagram of FIG. 7, where 124 is the speed of the motor shaft, 130 the speed of the sun gear, 132 the speed of the ring gear, 134 the speed of the planet gears, 136 the speed of the planet carrier and 138 the speed of the fan rotor. The speed ratio $R_1$ of the rotation speed of the motor shaft to the rotation speed of the planet carrier 36 can be derived from the number of teeth $N_S$ of the sun gear 30 to the number of teeth $N_R$ of the ring gear 32:

$$R_1 = \frac{N_S + N_R}{N_S} \qquad (3)$$

Figure 9:
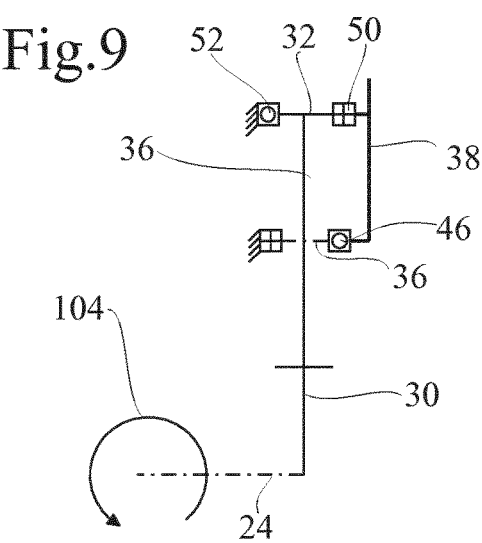
FIG. 9 is a functional diagram of the drive unit of FIG. 6 when the motor shaft of the drive unit rotates in the direction opposite to the preferred fan direction.
Figure 10:
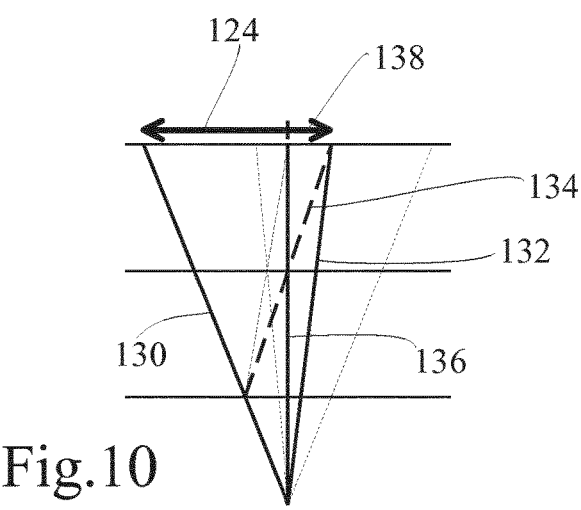
FIG. 10 is a speed diagram of the drive unit of FIG. 6 when the motor shaft of the drive unit rotates in the direction opposite to the preferred fan direction.

In the schematic illustrations of FIGS. 9 and 10, the sun gear 32 rotates with the motor shaft 24 in the direction 104 opposite to the preferred fan direction. As a result, the second intermediate free wheel 48 is locked to prevent rotation of the planet carrier 36 in the direction 104 opposite to the preferred fan direction. The first intermediate free wheel 52 remains unlocked and the planet gears 34 mesh with the sun gear 30 and ring gear 32 to drive the ring gear 32 in the preferred fan direction. The first output side free wheel 46 is unlocked and the second output side free wheel 50 is locked, so that the fan rotor 38 rotates with the ring gear 32 in the preferred fan direction. The resulting speed vectors are depicted in the speed diagram of FIG. 10. The speed ratio $R_2$ between the rotation speed of the fan rotor 36 and the rotation speed of the motor shaft 24 is such that:

$$R_2 = -\frac{N_R}{N_S} \qquad (4)$$

Accordingly, $$\left|\frac{R_1}{R_2}\right| = \frac{N_R + N_S}{N_R} \qquad (5)$$

In order to obtain a similar cooling capacity in both directions, $N_S$ has to be smaller than $N_R$ by at least one order of magnitude. Preferably, $$N_S \leq \frac{N_R}{10} \qquad (6)$$

Accordingly, $$\begin{cases} 1 \leq \left|\frac{R_1}{R_2}\right| \leq \frac{11}{10} \\ 11 \leq R_1 \\ R_2 \leq -10 \end{cases} \qquad (7)$$

Most preferably, $$N_S \leq \frac{N_R}{20} \qquad (8)$$

Accordingly, $$\begin{cases} 1 \leq \left|\frac{R_1}{R_2}\right| \leq \frac{21}{20} \\ 21 \leq R_1 \\ R_2 \leq -20 \end{cases} \qquad (9)$$

With this embodiment, the speed ratio can be sufficiently similar in both directions of rotation of the motor shaft 24 to ensure substantially the same cooling efficiency and noise level in both directions of travel, provided the system satisfies the inequality (6) and preferably the inequality (8). There is some latitude, albeit not as great as in the first embodiment, to adapt the speed ratio to the cooling needs by modifying the size of the sun gear 30 and planet gears 34 and this result is obtained with a greatly simplified arrangement, with only four free wheels.

Figure 11:
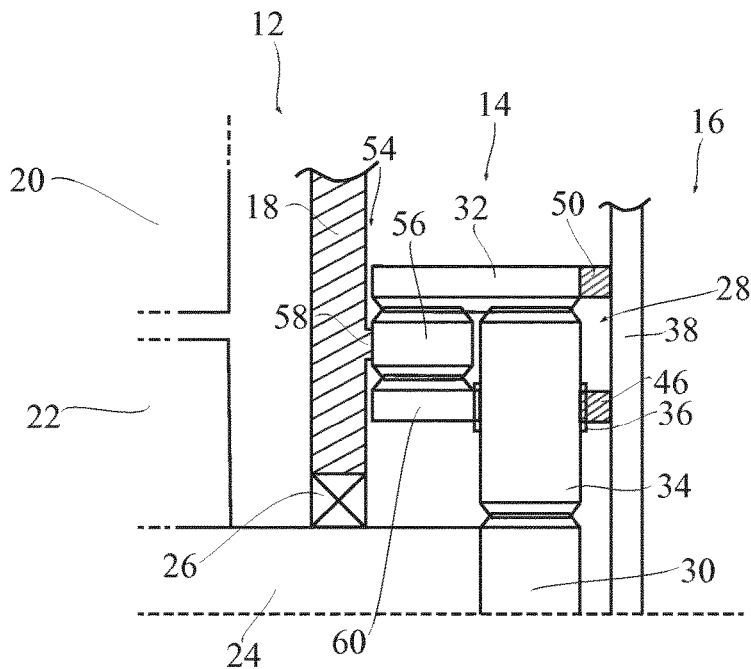
FIG. 11 is a schematic illustration of a self-ventilated drive unit according to still another embodiment of the invention.

Referring now the third embodiment of FIG. 11, a drive unit 10 for driving one or more wheels of a rail vehicle comprises a motor unit 12, a mechanical transmission 14, a fan 16 and a common housing 18. The motor unit 12 a stator 20 received in and fixed to the housing 18 and a rotor 22 fixed to or integral with a motor shaft 24 and supported for rotation about a revolution axis 100 by a main bearing 26.

The mechanical transmission 14 comprises a planetary gear set 28 consisting of a sun gear 10 fixed to or integral with the motor shaft 24, a ring gear 32, and a set of one more planet gears 36 supported for rotation by rotatable planet carrier 36 and meshing with the sun gear 30 and ring gear 32. The sun gear 30, ring gear 32 and rotatable planet carrier 36 have a common axis of rotation, which is coaxial with the revolution axis 100 of the motor shaft 24 and with a revolution axis of a rotor 38 of the fan 16. The planet gears 34 have rotate with respect to the planet carrier about axes of rotation that are preferably parallel with the revolution axis 100. The fan rotor 38 is optimised for operating in one direction of rotation, which will be called the preferred fan direction 102. The mechanical transmission 14 further comprises a synchronisation gearing 54 comprising a set of one or more synchronisation gears 56 supported for rotation by a fixed planet carrier 58 which can be fixed to or integral with a fixed part of the housing 18. The synchronisation gears 56 mesh with the ring gear 32 and with a planet carrier gear 60 formed on the planet carrier 36 to synchronise the rotation of the ring gear 32 and of the planet carrier 36.

The mechanical transmission further comprises a set of free wheels including:
  a first output side free wheel 46, which operates between the planet carrier 36 and the fan rotor 38, to block the rotation of the fan rotor 38 with respect to the planet carrier in the direction 104 opposite to the preferred fan direction;
  a second output side free wheel 50, which operates between the ring gear 32 and the fan rotor 38, to block the rotation of the fan rotor 38 with respect to the ring gear 32 in the direction 104 opposite to the preferred fan direction.

As a result of this arrangement, the mechanical transmission is operative to drive the fan rotor 38 in the preferred fan direction 102 with a first constant gear ratio $R_1$ when the motor shaft 24 rotates in the preferred fan direction 102, and to drive the fan rotor 38 in the preferred fan direction 102 with a second constant gear ratio $R_2$ when the motor shaft rotates in the direction 104 opposite to the preferred fan direction. This is illustrated in more details on FIGS. 12 to 15.

Figure 12:
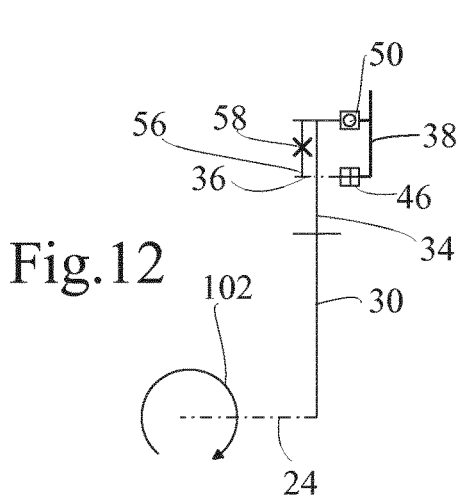
FIG. 12 is a functional diagram of the drive unit of FIG. 11 when the motor shaft of the drive unit rotates in the preferred fan direction.
Figure 13:
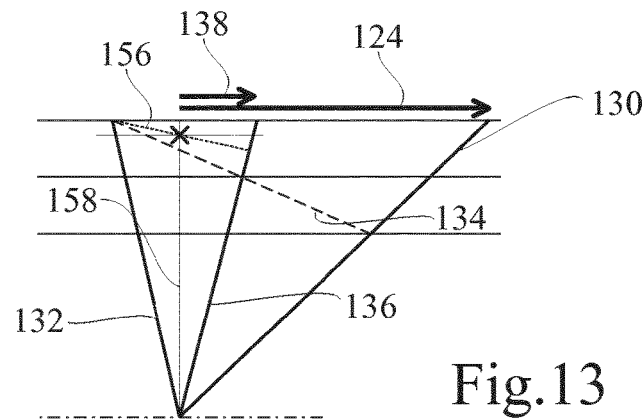
FIG. 13 is a speed diagram of the drive unit of FIG. 11 when the motor shaft of the drive unit rotates in the preferred fan direction.

In the schematic illustrations of FIGS. 12 and 13, the sun gear 30 rotates in the preferred fan direction 102 together with the motor shaft 24. The planet gears 34 mesh with the sun gear 30 and ring gear 32 to drive the ring gear 32 in the direction opposite to the preferred fan direction. The synchronisation gears 56 mesh with the ring gear 32 and the planet carrier 36 to drive the planet carrier 36 in the preferred fan direction. As a result, the first output side free wheel 46 is locked and the second output side free wheel 50 is unlocked, so that the fan rotor rotates together with the planet carrier 36 in the preferred fan direction 102. The resulting speed vectors are depicted in the speed diagram of FIG. 13, where 124 is the speed of the motor shaft, 130 the speed of the sun gear, 132 the speed of the ring gear, 134 the speed of the planet gears, 136 the speed of the planet carrier, 138 the speed of the fan rotor, 156 the speed of the synchronisation gears and 158 the speed of the fixed planet carrier 58.

The speed ratio in this instance depends on the number of teeth $N_S$ of the sun gear 30, the number of teeth $N_R$ of the ring gear 32 and the number of teeth $N_C$ of the planet carrier gear 60, as follows:

$$R_1 = \frac{N_S + N_C + N_R}{N_S} \tag{10}$$

Figure 14:
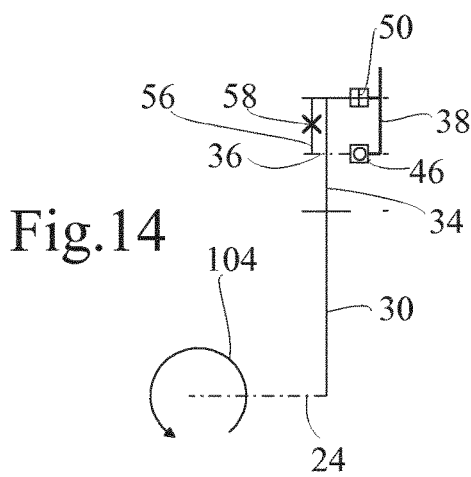
FIG. 14 is a functional diagram of the drive unit of FIG. 11 when the motor shaft of the drive unit rotates in the direction opposite to the preferred fan direction.
Figure 15:
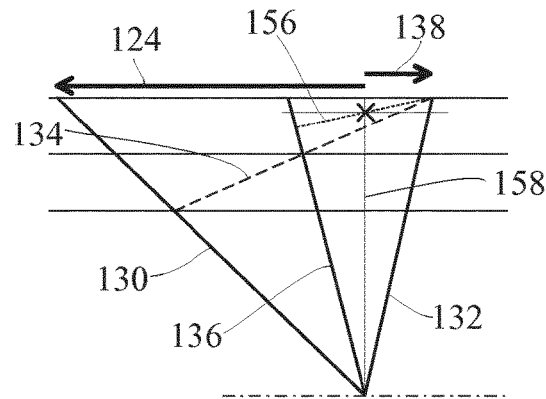
FIG. 15 is a speed diagram of the drive unit of FIG. 11 when the motor shaft of the drive unit rotates in the direction opposite to the preferred fan direction.

In the schematic illustrations of FIGS. 14 and 15, the sun gear 30 rotates with the motor shaft 24 in the direction 104 opposite to the preferred fan direction. The planet gears 36 mesh with the sun gear 30 and ring gear 32 to drive the ring gear 32 in the preferred fan direction. The synchronisation gears 56 mesh with the ring gear 32 and the planet carrier gear 60 to drive the planet carrier 36 in the direction opposite to the preferred fan direction. As a result, the first output side free wheel 46 is unlocked and the second output side free wheel 50 is locked, so that the fan rotor 38 rotates together with the planet carrier 36 in the preferred fan direction. The gear ratio between the fan rotor 38 and the motor shaft 24 in this case is as follows:

$$R_2 = -\frac{N_R}{N_C} \cdot \frac{N_S + N_R + N_C}{N_S} \tag{11}$$

Accordingly, $$\left|\frac{R_2}{R_1}\right| = \frac{N_R}{N_C} \tag{12}$$

In order to obtain a similar cooling capacity in both directions, $N_S$ has to substantially equal to $N_R$. Preferably, $$1 \leq \frac{N_R}{N_C} \leq \frac{11}{10} \tag{13}$$

Accordingly, $$1 \leq \left|\frac{R_2}{R_1}\right| \leq \frac{11}{10} \tag{14}$$

Most preferably, $$1 \leq \frac{N_R}{N_C} \leq \frac{105}{100} \tag{15}$$

Accordingly, $$1 \leq \left|\frac{R_2}{R_1}\right| \leq \frac{105}{100} \tag{16}$$

With this embodiment, the speed ratio can be adapted to the cooling needs by simply modifying the size of the sun gear 30 and planet gears, for a given ring gear diameter. The size of the synchronisation gears 56 has to be kept small, i.e. to satisfy the inequality (13) and preferably the inequality (15) to minimise the difference in cooling efficiency and noise level in the two directions of rotation. These results are obtained with a greatly simplified arrangement, with only two free wheels.

Various modifications can be made. The stator 20 can be outside or inside the rotor 22. The motor shaft 24 can be plain or hollow, and can have any shape with a symmetry of revolution. The free wheels can be of any type. The planet gears 34 can rotate with respect to the planet carrier 36 about axes of rotation that are perpendicular to the axis of revolution 100. The synchronising gears 60 can be mounted between the sun gear 30 and planet carrier 36.

It may be advantageous to increase gear wheel play/tooth clearance and/or the free wheel clearance (i.e. the rotation until free wheel is locked) to avoid mechanical stress of the mechanical transmission.

The invention claimed is:

1. A self-ventilated bi-directional traction drive unit comprising a bi-directional motor, an asymmetric fan for ventilating the motor, and a mechanical transmission between a motor shaft of the motor and a fan rotor of the fan, wherein the mechanical transmission is operative to drive the fan rotor in a preferred fan direction with a first constant gear ratio $R_1$ when the motor shaft rotates in a first traction direction and to drive the fan rotor in the preferred fan direction with a second constant gear ratio $R_2$ when the motor shaft rotates in a second traction direction opposite to the first traction direction, wherein the mechanical transmission includes a planetary gear train comprising a sun gear, a ring gear and a set of one or more planet gears supported on at least one planet carrier and further includes free wheels, wherein a first of the free wheels operates between the ring gear and the fan rotor to block the rotation of the fan rotor with respect to the ring gear in the preferred fan direction, a second of the free wheels operates between the planet carrier and the fan rotor to block the rotation of the fan rotor with respect to the planet carrier in a direction opposite to the preferred fan direction, and a third of the free wheels operates between the motor shaft and the sun gear to block the rotation of the sun gear with respect to the motor shaft in the direction opposite to the preferred fan direction.

2. The self-ventilated bi-directional traction drive unit of claim 1, wherein the mechanical transmission is such that:

$$\frac{90}{100} \leq \left|\frac{R1}{R2}\right| \leq \frac{110}{100}.$$

3. The self-ventilated bi-directional traction drive unit of claim 1, wherein the mechanical transmission is such that the first constant gear ratio $R_1$ is different from 1:1 and the second constant gear ratio $R_2$ is different from 1:1.

4. The self-ventilated bi-directional traction drive unit of claim 1, wherein the free wheels, the motor shaft and the fan rotor have a common rotation axis.

5. The self-ventilated bi-directional traction drive unit of claim 1, wherein the planet gears are free to rotate in both directions with respect to the planet carrier.

6. The self-ventilated bi-directional traction drive unit of claim 1, wherein one of the free wheels operates between the planet carrier and a fixed housing of the traction drive unit to block the rotation of the planet carrier with respect to the fixed housing in the direction opposite to the preferred fan direction.

7. The self-ventilated bi-directional traction drive unit of claim 1, wherein a fourth of the free wheels operates between the sun gear and a fixed housing of the drive unit, to block the rotation of the sun gear with respect to the fixed housing in the preferred fan direction.

8. A self-ventilated bi-directional traction drive unit comprising a bi-directional motor, an asymmetric fan for ventilating the motor, and a mechanical transmission between a motor shaft of the motor and a fan rotor of the fan, wherein the mechanical transmission is operative to drive the fan rotor in a preferred fan direction with a first constant gear ratio $R_1$ when the motor shaft rotates in a first traction direction and to drive the fan rotor in the preferred fan direction with a second constant gear ratio $R_2$ when the motor shaft rotates in a second traction direction opposite to the first traction direction, wherein the mechanical transmission includes a planetary gear train comprising a sun gear, a ring gear and a set of one or more planet gears supported on at least one planet carrier and further includes free wheels, wherein a first of the free wheels operates between the ring gear and the fan rotor to block the rotation of the fan rotor with respect to the ring gear in the preferred fan direction, a second of the free wheels operates between the planet carrier and the fan rotor to block the rotation of the fan rotor with respect to the planet carrier in a direction opposite to the preferred fan direction, and a third of the free wheels operates between the sun gear and a fixed housing of the drive unit, to block the rotation of the sun gear with respect to the fixed housing in the preferred fan direction.

9. The self-ventilated bi-directional traction drive unit of claim 8, wherein the mechanical transmission is such that:

$$\frac{90}{100} \leq \left|\frac{R1}{R2}\right| \leq \frac{110}{100}.$$

10. The self-ventilated bi-directional traction drive unit of claim 8, wherein the mechanical transmission is such that the first constant gear ratio $R_1$ is different from 1:1 and the second constant gear ratio $R_2$ is different from 1:1.

11. The self-ventilated bi-directional traction drive unit of claim 8, wherein the free wheels, the motor shaft and the fan rotor have a common rotation axis and the planet gears are free to rotate in both directions with respect to the planet carrier.

12. A self-ventilated bi-directional traction drive unit comprising a bi-directional motor, an asymmetric fan for ventilating the motor, and a mechanical transmission between a motor shaft of the motor and a fan rotor of the fan, wherein the mechanical transmission is operative to drive the fan rotor in a preferred fan direction with a first constant gear ratio $R_1$ when the motor shaft rotates in a first traction direction and to drive the fan rotor in the preferred fan direction with a second constant gear ratio $R_2$ when the motor shaft rotates in a second traction direction opposite to the first traction direction, wherein the mechanical transmission includes a planetary gear train comprising a sun gear, a ring gear and a set of one or more planet gears supported on at least one planet carrier and further includes free wheels, wherein a first of the free wheels operates between the ring gear and the fan rotor to block the rotation of the fan rotor with respect to the ring gear in the preferred fan direction, a second of the free wheels operates between the planet carrier and the fan rotor to block the rotation of the fan rotor with respect to the planet carrier in a direction opposite to the preferred fan direction, and the mechanical transmission includes at least a set of one or more synchronizing gears meshing with a carrier gear fixed to the planet carrier and with one of the sun or ring gears, the set of one or more synchronising gears being each supported for rotation about a rotation axis fixed relative to a housing of the drive unit.

13. The self-ventilated bi-directional traction drive unit of claim 12, wherein the mechanical transmission is such that:

$$\frac{90}{100} \leq \left|\frac{R1}{R2}\right| \leq \frac{110}{100}.$$

14. The self-ventilated bi-directional traction drive unit of claim 12, wherein the mechanical transmission is such that the first constant gear ratio $R_1$ is different from 1:1 and the second constant gear ratio $R_2$ is different from 1:1.

* * * * *

UNITED STATES PATENT AND TRADEMARK OFFICE
CERTIFICATE OF CORRECTION

PATENT NO. : 10,605,334 B2  
APPLICATION NO. : 15/742110  
DATED : March 31, 2020  
INVENTOR(S) : Jan Buschbeck Page 1 of 1

It is certified that error appears in the above-identified patent and that said Letters Patent is hereby corrected as shown below:

On the Title Page

Column 2, Assistant Examiner, Line 1, delete "James J Taylor, III" and insert -- James J Taylor, II --

Column 2, (Item (57)) ABSTRACT, Line 8, delete "Ri" and insert -- $R_1$ --

Column 2, (Item (57)) ABSTRACT, Line 17, delete "52)," and insert -- 52). --

Page 2, Column 1, (Item (57)) ABSTRACT, Line 7, below "(I)." insert -- $\frac{90}{100} \leq \left|\frac{R_1}{R_2}\right| \leq \frac{110}{100}$ --

Signed and Sealed this  
Twenty-eighth Day of July, 2020

Andrei Iancu  
*Director of the United States Patent and Trademark Office*